United States Patent [19]

Takagi

[11] Patent Number: 4,810,037
[45] Date of Patent: Mar. 7, 1989

[54] AUTOMOTIVE SEAT WITH SEAT BELT
[75] Inventor: Genjiro Takagi, Akishima, Japan
[73] Assignee: Tachi-S Co., Ltd., Tokyo, Japan
[21] Appl. No.: 153,509
[22] Filed: Feb. 4, 1988
[51] Int. Cl.[4] ............................................. A62B 35/00
[52] U.S. Cl. .................................. 297/481; 297/113; 297/191
[58] Field of Search ............... 297/191, 481, 482, 113, 297/485, 468

[56] References Cited

U.S. PATENT DOCUMENTS

| | | | |
|---|---|---|---|
| 950,441 | 2/1910 | Ekstrand | 297/191 |
| 2,249,849 | 7/1941 | Owler | 297/113 X |
| 3,076,679 | 2/1963 | Lorber | 297/191 |
| 3,287,061 | 11/1966 | Nicholas | 297/481 |
| 3,400,978 | 9/1968 | Totten | 297/481 |
| 3,455,603 | 7/1969 | Nicholas | 297/482 |
| 3,576,346 | 4/1971 | Hutchinson | 297/481 |
| 3,740,094 | 6/1973 | Hornyak | 297/481 |
| 3,841,658 | 10/1974 | Singh | 297/482 |
| 4,210,365 | 7/1980 | Breitschwerdt et al. | 297/481 |
| 4,687,254 | 8/1987 | Baumert et al. | 297/481 |

Primary Examiner—Francis K. Zugel
Attorney, Agent, or Firm—Browdy and Neimark

[57] ABSTRACT

An automotive seat provided with a plurality of seat belts, in which a seat belt storage holder is embedded in the lower end portion of a seat back, with the opened portion of the storage holder being exposed at the frontal surface of the seat back. In such storage holder, the seat belts are neatly stored in a removable manner.

9 Claims, 3 Drawing Sheets

AUTOMOTIVE SEAT WITH SEAT BELT

BACKGROUND OF THE INVENTION

1. Field of the Invention

The present invention relates to an automotive seat with a seat belt provided thereon, and in particular relates to a three-occupant capacity automotive seat having a seat belt storage holder for storing seat belts therein.

2. Description of the Prior Art

In a conventional three-occupant automotive seat, there has been provided four seat belts in order for three occupants on the seat to restrain their respective bodies safely to the seat by the corresponding seat belts. Each of the seat belt extend from the lower part of a seat back upwardly above a seat cushion. The problem in this respect is that the four seat belts are left in a jumble or in an entangled state, leading to confusion on the part of the occupants' because they can not easily recognize their own seat belts.

In terms of keeping seat belt neatly, there has been suggested in the U.S. Pat. No. 3,287,061 a storage means in which two seat belts are kept in order, the storage means being provided centrally of the forward wall portion of a seat cushion and adapted to receive the buckles respectively of the two seat belts.

However, this prior art is solely for use with a seat of two-occupant seating capacity, and consequently is not applicable at all to a seat of three-occupant seating capacity, by reason of the fact that the storage means does not accommodate more than two buckles of the seat belts and the exposure of the storage means provided centrally of the forward part of the seat is much undesirable in that it contacts or interferes with the legs of a middle occupant sitting on the central portion of the seat, and further impairs the aesthetic appearance of the seat.

SUMMARY OF THE INVENTION

It is a primary purpose of the present invention to provide an automotive seat with a seat belt which is aesthetically improved in appearance.

To achieve this purpose, the present invention comprises a storage holder for storing plural seat belts therein, which is embedded in a seat back with only the opened portion of the holder being exposed out of the seat. Accordingly, all the portions of the storage holder but such opened portion thereof are concealed from view, and the seat belts, which extends from between the seat back and a seat cushion are stored in the storage holder, without being left loosely on the seat cushion.

It is another purpose of the present invention to provide an improved seat belt storage holder which permits accommodating a plurality of seat belts in a well-ordered and neat fashion, to thereby enable a plurality of occupants on the seat to clearly recognize their own seat belts, with much ease.

For such purpose, the seat belt storage holder in the invention is formed with plural compartment walls in its interior, providing a plurality of storage rooms, each of which accommodates a corresponding one of the seat belts. Hence, each seat belt is neatly kept in each storage room, which makes it easy for the occupants to select and take out their own seat belts therefrom for use.

It is still another purpose of the present invention to provide an improved seat with seat belts which allows the occupants to sit thereon without interference of the seat belt storage holder.

To attain this purpose, according to the present invention, the seat belt storage holder is embedded in the lower end portion of the seat back adjacent to the rear end portion of the seat cushion, and there is formed a forwardly projected portion in the frontal surface of the seat back such that the forwardly projected portion is disposed above the seat belt storage holder. With this structure, the storage holder is kept from contact with the buttocks of an occupant sitting on the seat, whereby the seating comfort of the seat is not deteriorated by the storage holder provided therein, thus avoiding unpleasing touch in the seat.

DETAILED DESCRIPTION OF PREFERRED EMBODIMENTS OF THE INVENTION

Figure 1:
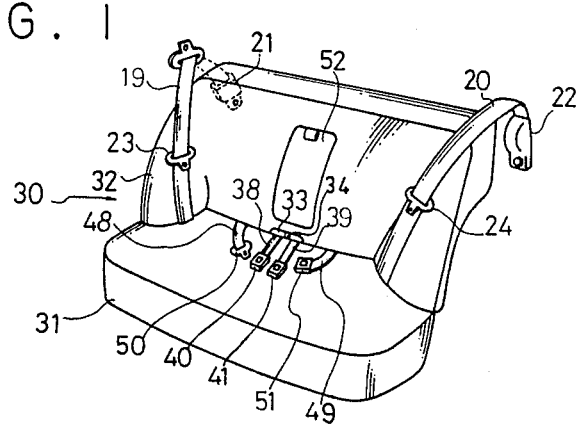
FIG. 1 is an perspective view of an automotive seat provided with seat belts in accordance with the present invention, showing the state where the seat belts are removed from a seat belt storage holder.
Figure 2:
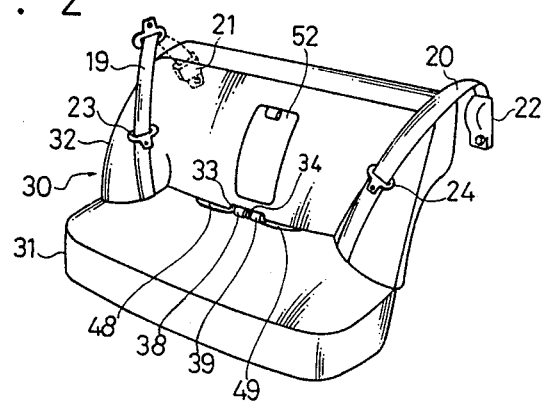
FIG. 2 is an perspective view of the same automotive seat as in the FIG. 1, which shows the state where the seat belts are stored in the seat belt storage holder.
Figure 3:
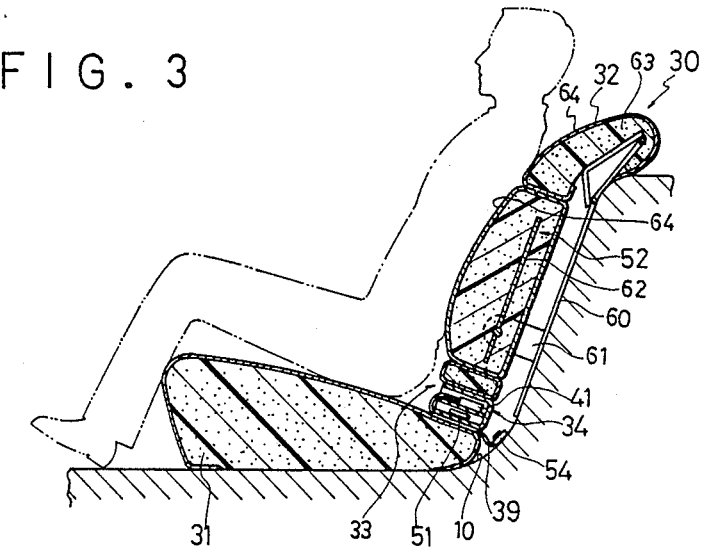
FIG. 3 is a sectional view of the automotive seat as in the FIG. 2.

Referring to FIGS. 1 and 2, there is shown an automotive seat (30) provided with four seat belts (38)(39)(48)(49), of a three-occupant seating capacity, comprising couch-type seat cushion (31) and seat back (32). The frontal surface of the seat back (32) is formed in a forwardly projected manner as best shown in FIG. 3, for a reason to be explained later.

The seat back (32) is formed with an upwardly cut-away portion (33) substantially centrally of its lower end portion. In that cut-away portion (33), a seat belt storage holder (34) is provided in an embedded manner such that its opened portion is exposed at the frontal surface of the seat back (34).

Numerals (19)(20) designate right and left shoulder seat belts, respectively. The right shoulder seat belt (19) is at its upper end fixed to a retractor (21) and at its lower fixed to an automobile floor (10) (See FIG. 3). Likewise, the left shoulder seat (20) is at its upper end fixed to a retractor (22) and at its lower end fixed to the floor (10). Although now shown, the retractors (21)(22) are fixed at a suitable portion of an automobile, such at a rear pillar or an inner panel provided on the inner walls of the automobile.

The right and left shoulder seat belts (19)(20) are respectively equipped with tongues (23)(24).

The foregoing seat belts (38)(39) are respectively provided with buckles (40)(41).

When in use, the tongue (23) of the right shoulder seat belt (29) is detachably fitted to the buckle (40) of the seat belt (38) while the tongue (24) of the left shoulder seat belt (20) is detachably fitted to the buckle (41) of the seat belt (39). Also, the tongue (50) of the seat belt (48) is detachably fitted to the buckle (51) of the seat belt (49). In this way, a left-side occupant is restrained by the left shoulder seat belt (19), a middle occupant is by the two seat belts (48)(49), and a right-side occupant is by the right shoulder seat belt (20).

As shown in FIG. 3, the rear ends respectively of the seat belts (38)(39)(48)(49) extend through the boundary between the rear end portion of the seat cushion (31) and the lower end portion of the seat back (32) in a direction rearwardly of the seat (30) and are fixed to the floor (10) by means of fixing screws (54).

As stated above, the frontal surface of the seat back (32) is projected forwardly above the cut-away portion (33), and due to such structure, the buttocks of an occupant on the seat is positioned a little far from the exposed opened portion of the storage holder (34), as in FIG. 3, whereupon the exposed opened portion of the storage holder (34) is kept from contact with the buttocks of occupant, and there is no unpleasing touch in the seat.

Numeral (52) denotes an arm rest provided in the frontal surface of the seat back (32) such that it is disposed above the cut-away portion (33) and rotatably supported on a bracket (61) welded to a frame (60) in such a manner that when in use, the arm rest (52) is rotated forwardly from the seat back (32) and retained substantially horizontally relative to the seat cushion (31), whereas when not in use, it is rotated backwardly from such use position to rest on a support plate (62) and kept within the seat back (32). In this regard, FIG. 2 and 3 show the arm rest (52) as being in non-use state and kept within the seat back (32) with its bottom portion serving as an integral portion of the frontal surface of the seat back (32). The bottom portion of the arm rest (52) is therefore formed in a forwardly projected manner in conformity with the likewise projected frontal surface of the seat back (32) mentioned above.

Designations (63)(64) denote a foam cushion member and a covering member, respectively.

Figure 4:
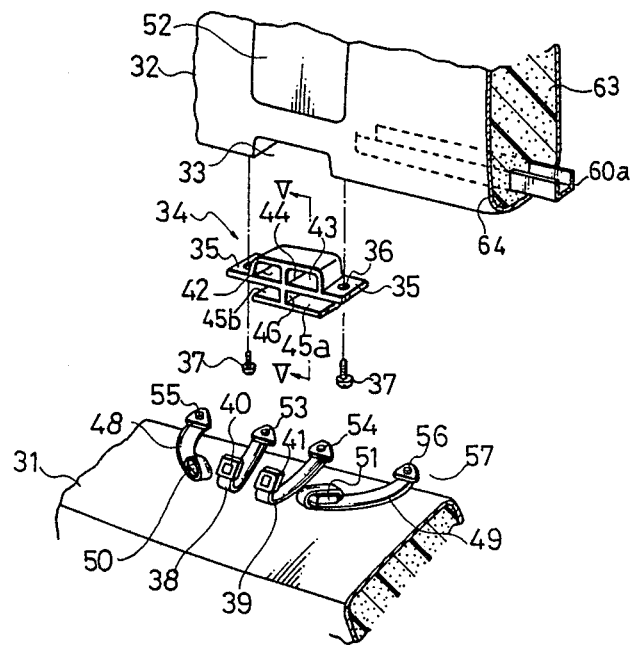
FIG. 4 is a partially broken, exploded perspective view of a principal portion of the present invention, in which the seat belt storage holder is shown itself.

Referring now to FIG. 4, at the cut-away portion (33) of the seat back (32), the seat belt storage holder (34) is fixed by means of two screws (37) to a frame (60a) which is a part of the frame (60) and embedded within the seat back (32), with the screws (37) being respectively inserted through the holes (36) perforated in each of lateral flanges (35) formed laterally of the storage holder (34).

As to the storage holder (34), there are two upper storage rooms or shelf members (42)(43) formed at its upper portion and two lower storage rooms or shelf members (45a)(45b) formed at its lower portion, such that both upper and lower rooms (42)(43)(45a)(45b) are integrally formed together, and that the upper storage rooms (42)(43) are opened only at their respective forward portions while on the other hand, the lower storage rooms (45a) (45b) are opened at their respective forward and lateral side portions. Numeral (44) represents an upper compartment wall, by which the two upper storage rooms (42)(43) are defined in a symmetrically right and left manner in relation thereto. Numeral (46) stands for a lower compartment wall, by which the two lower storage rooms (45a)(45b) are defined in a symmetrically right and left manner in relation thereto.

Figure 5:
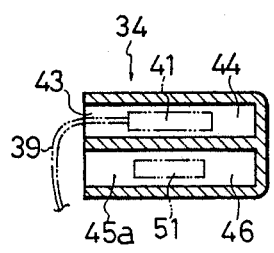
FIG. 5 is a sectional view taken along the line V—V in the FIG. 4.
Figure 6:
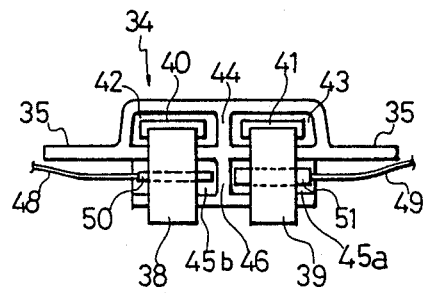
FIG. 6 is a partially enlarged front view of the seat belt storage holder, showing the state where the seat belts are stored in the holder.

As shown in FIGS. 5 and 6, the buckles (40) of the seat belt (38) and the buckles (41) of the seat belt (39) are, respectively, stored in the right upper storage room (42) and left upper storage room (43), and further, the tongue (50) of the seat belt (48) and the buckle (51) of the seat belt (49) are, respectively, stored in the right lower storage room (45b) and left lower storage room (45a).

The seat belts (38)(39)(48)(49), as best shown in FIG. 4, are at their respective rear ends provided with fixing bolts (53)(54)(55)(56), which are fixed to the floor (10).

Figure 7:
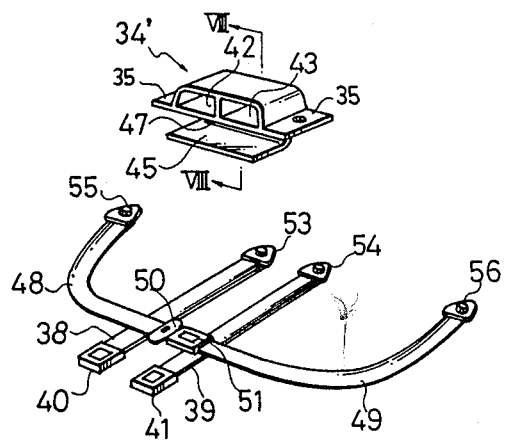
FIG. 7 is a perspective view of another embodiment of seat belt storage holder and seat belts.
Figure 8:
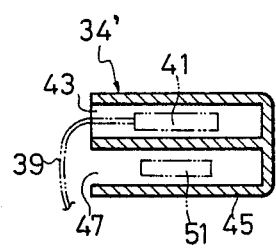
FIG. 8 is a sectional view taken along VIII—VIII in the FIG. 7.
Figure 9:
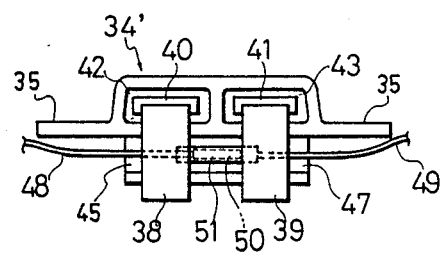
FIG. 9 is a partially enlarged front view of the another embodiment as in FIG. 7, showing the state where the seat belts are stored in the holder.

Referring to FIGS. 7 through 9, there is shown another embodiment of the present invention, in which a seat belt storage holder (34') is formed in the same manner as described above, except that its lower storage room is not provided with any compartment wall. As best shown in FIG. 7, the lower storage room (47) of the holder (34') is formed by a L shaped portion (45) which is integrally connected with two upper storage rooms (42)(43).

In the present embodiment, the tongue (50) of a seat belt (48) is firstly fitted to the buckle (51) of a seat belt (49) and stored in the lower storage room (47), after which, the buckle (40) of a seat belt (38) and buckle (41) of a seat belt (39) are respectively stored in the left upper storage room (42) and right upper storage room (43). For that purpose, it is important that the seat belts (48)(49) be formed greater in length than those of the above-described first embodiment so that they are easily connected with each other.

With the above-discussed construction, it is to be appreciated that, (i) when two occupants are seated in the seat, the seat belts (48)(49) are stored in the lower storage rooms (45a)(45b) or room (45), allowing the other seat belts (38)(39) to be connected respectively with the shoulder seat belts (19)(20) for use, and then the arm rest (52) is rotated forwardly from the seat back (32) to a substantially horizontal use position relative to the seat cushion (31), whereupon the storage holder (34) or (34') is completely concealed from view, helping to maintain the aesthetic appearance of the seat, (ii) when three occupants are seated in the seat, the arm rest (52) is kept within the seat back (32) as in FIG. 1, and all the seat belts (38)(39)(48)(49) are removed from the respective storage rooms (42)(43) (45a)(45b) of the holder (34) or those (42)(43)(47) of the holder (34') for use of each occupant, whereupon prior to such use, those seat belts are neatly stored in their respective storage rooms, the three occupants can easily recognize their own seat belts and take out them for use, and (iii) when no occupant is seated in the seat, all those seat belts are stored in the storage holder (34) or (34'), presenting a good appearance of the seat, as described above.

Accordingly, in accordance with the present invention, the seat belt storage holder is almost completely concealed from view, a plurality of seat belts are neatly stored in the storage holder so that each of plural occupants can easily recognize their own seat belts and take out them, and the storage holder per se is free of contact with the buttocks of occupant on the seat, thus avoiding unpleasing seating touch.

The description above has just been given of preferred embodiments of the present invention, but it should be understood that the invention is not limited to the embodiments illustrated but other replacements, modifications and additions may structurally be possible without departing from the spirit of the appended claims for the invention.

What is claimed is:

1. An automotive seat with a seat belt, which includes a seat cushion and a seat back, said automotive seat comprising:

four seat belts arranged substantially centrally of said seat, extending from between said seat cushion and seat back, said seat belts comprising a first seat belt, a second seat belt, a third seat belt, and a fourth seat belt, said seat belts being disposed in a row in a spaced-apart relationship with one another, said second and third seat belts being interposed between said first and fourth seat belts, wherein said four seat belts are fixed to a floor of an automobile at respective first ends thereof and second ends thereof extend through between said seat cushion and seat back, and are situated at a seating surface of said seat for use;

a storage holder provided between said seat cushion and said seat back disposed at a position substantially corresponding to that of said four seat belts, said storage holder having at its upper portion a pair of storage upper shelf members which are each opened in their forward portions and having at its lower portion a lower shelf member which is opened in its forward portion and both lateral sides;

said pair of storage upper shelf members of said storage holder being for accommodation of said second and third seat belt therein; and said lower shelf member of said storage holder being for accommodation of said first and fourth seat belts therein.

2. The automotive seat according to claim 1, wherein said seat back is so formed as to have a three-occupant seating capacity.

3. The automotive seat according to claim 1, wherein a frontal surface of said seat back is formed in a forwardly projected manner so that said storage holder embedded at said lower end portion of said seat back is kept from contact with an occupant sitting on said seat.

4. The automotive seat according to claim 1, wherein said storage holder is adapted to accommodate a tongue and buckle of said four seat belts so that they may be removed from and stored in said storage holder.

5. The automotive seat according to claim 1, wherein said storage holder has in an interior of the upper portion a compartment wall to thereby define the pair of storage upper shelf members and said lower shelf member is so formed that two seat belts with their tongue and buckles connected with each other are stored therein.

6. The automotive seat according to claim 1, wherein an arm rest is provided in said seat back such that it is rotatable from within said seat back to a use position or from the use position back to a home position within said seat back, and wherein said storage holder is disposed below said arm rest.

7. The automotive seat according to claim 1, wherein said seat comprises a rear seat having a three-occupant seating capacity.

8. The automotive seat according to claim 1, wherein said lower shelf member comprises a compartment wall at a substantially central position therein for dividing said lower shelf member into two compartments for storing one each of said first and fourth seat belts.

9. The automotive seat according to claim 1, wherein said lower shelf member has an L-shaped cross-section having one leg of the L integrally connected to said pair of upper shelf members.

* * * * *